(12) United States Patent
Branchet-Cohen et al.

(10) Patent No.: US 9,671,021 B2
(45) Date of Patent: Jun. 6, 2017

(54) ARRANGEMENT OF AN OBLIQUE-CONTACT SEAL IN A TRAPEZOIDAL GROOVE

(71) Applicants: SNECMA, Paris (FR); CENTRE NATIONAL D'ETUDES SPATIALES CNES, Paris (FR)

(72) Inventors: Christelle Lea Branchet-Cohen, Vernon (FR); Karine Sandra Christel Lenain, Wissous (FR)

(73) Assignees: SNECMA, Paris (FR); CENTRE NATIONAL D'ETUDES SPATIALES CNES, Paris (FR)

( * ) Notice: Subject to any disclaimer, the term of this patent is extended or adjusted under 35 U.S.C. 154(b) by 122 days.

(21) Appl. No.: 14/351,353

(22) PCT Filed: Oct. 11, 2012

(86) PCT No.: PCT/FR2012/052315
§ 371 (c)(1),
(2) Date: Apr. 11, 2014

(87) PCT Pub. No.: WO2013/054050
PCT Pub. Date: Apr. 18, 2013

(65) Prior Publication Data
US 2014/0252765 A1    Sep. 11, 2014

(30) Foreign Application Priority Data
Oct. 14, 2011 (FR) ...................................... 11 59311

(51) Int. Cl.
*F16L 23/18* (2006.01)
*F16J 15/06* (2006.01)
*F16J 15/08* (2006.01)

(52) U.S. Cl.
CPC ............ *F16J 15/06* (2013.01); *F16J 15/0887* (2013.01); *F16L 23/18* (2013.01)

(58) Field of Classification Search
CPC .......... F16J 15/06; F16J 15/0887; F16L 23/18
(Continued)

(56) References Cited

U.S. PATENT DOCUMENTS 2,898,000 A * 8/1959 Hanny ................. F16J 15/0887
285/336
3,161,318 A * 12/1964 Krueger ............... F16J 15/0887
220/304

(Continued)

FOREIGN PATENT DOCUMENTS

| EP | 0 851 158 | 7/1998 |
|----|-----------|--------|
| EP | 1 420 161 | 5/2004 |
| FR | 2 726 879 | 5/1996 |

OTHER PUBLICATIONS

International Search Report Issued Jan. 30, 2013 in PCT/FR12/052315 Filed Oct. 11, 2012.

*Primary Examiner* — David E Bochna
(74) *Attorney, Agent, or Firm* — Oblon, McClelland, Maier & Neustadt, L.L.P.

(57) ABSTRACT

An arrangement of a biconical annular seal having a laid down V shaped cross-section, in an annular groove having a trapezoid shaped cross-section, a small base of the trapezoid corresponding to a cylindrical bottom of the groove and being radially inwardly open at a great base of the trapezoid. The seal includes a radially outer annular heel and two generally conical annular wings extending radially inwardly from the heel, an inner radial end of each wing being axially bearing against an associated wall of the groove. The seal is mounted in the groove such that the heel of the seal is located radially distal to a bottom of the groove.

8 Claims, 2 Drawing Sheets

(58) Field of Classification Search
USPC .......................................................... 285/368
See application file for complete search history.

(56) References Cited

U.S. PATENT DOCUMENTS

| | | | | |
|---|---|---|---|---|
| 5,058,906 A * | 10/1991 | Adamek | ................. | F16L 17/08 |
| | | | | 285/336 |
| 5,076,617 A * | 12/1991 | Bronnert | ................. | F16L 17/06 |
| | | | | 285/368 |
| 5,669,612 A * | 9/1997 | Nicholson | ............ | F16J 15/0887 |
| | | | | 285/336 |
| 6,241,254 B1 * | 6/2001 | Gromyko | ................. | F16L 17/03 |
| | | | | 285/368 |
| 6,612,584 B1 * | 9/2003 | Ferouz | ................. | F16J 15/0887 |
| | | | | 277/609 |
| 7,118,139 B2 * | 10/2006 | Katorgin | ................ | F16L 27/053 |
| | | | | 285/368 |
| 8,505,983 B2 * | 8/2013 | Hiss | .................... | B65D 39/025 |
| | | | | 285/368 |
| 2010/0181734 A1 * | 7/2010 | Halling | ................. | F01D 11/003 |
| | | | | 277/608 |
| 2015/0054276 A1 * | 2/2015 | Alsup | .................... | F16J 15/068 |
| | | | | 285/368 |

* cited by examiner

ARRANGEMENT OF AN OBLIQUE-CONTACT SEAL IN A TRAPEZOIDAL GROOVE

TECHNICAL FIELD

The invention relates to the fitting of a biconical seal, that is the cross-section of which is in the shape of a laid down "V", radially inwardly open, into a trapezoidal groove.

The invention more particularly relates to the fitting of a static biconical seal for connecting two ducts by flanges.

STATE OF PRIOR ART

In order to ensure a good tightness of the assembly and the connection of two ducts with each other, it is known to make the assembly through a flange system allowing the axial clamping of the ends of the ducts against each other and the use of a seal between both ends of the ducts.

The seal used is a biconical type seal, the axial cross-section of which is in the shape of a laid down V, and it is fitted in a trapezoidal groove such that the free end of each wing of the V is bearing against a tilted wall of the groove.

Document FR 2.726.879 describes such a biconical seal which is fitted in a trapezoidal cross-section groove.

According to the document, it is known to fit the seal with a "minimum" radial clearance between the heel and the bottom of the groove upon placing the seal into the housing.

Then, when both flanges are clamped against each other, the seal is axially compressed and deforms such that the heel also deforms to contact the bottom of the groove.

Consequently, according to this document, in operation, that is when the seal is mounted in the annular groove, and not only positioned in the groove, the heel of the seal is contacting the bottom of the groove.

Because of dimensional manufacturing tolerances of the flanges and seal, the axial gap of the side faces of the groove, against which the wings of the seal are bearing, can vary.

Thus, the initial value of the axial compression of the seal is not reliably determined, such that the seal can be too or insufficiently compressed, thus being detrimental to the tightness of the assembly.

As a result, the tightness is not optimally ensured for such an arrangement.

One object of the invention is to provide an arrangement of a biconical seal in an annular groove enabling the tightness achieved to be improved.

DISCLOSURE OF THE INVENTION

The invention provides an arrangement of a biconical annular seal having a laid down V shaped cross-section, in an annular groove having a trapezoid shaped cross-section, the small base of the trapezoid corresponding to the cylindrical bottom of the groove and being radially inwardly open at the great base of the trapezoid, wherein the seal includes a radially outer annular heel and two generally conical annular wings extending radially inwardly from the heel, the inner radial end of each wing axially bearing against an associated wall of the groove, characterised in that the seal is mounted in the groove such that the heel of the seal is radially located distal to the bottom of the annular groove.

Such a radial clearance enables the seal to be radially moved in the groove, in order to compensate for possible dimensional deviations of components of the arrangement.

Preferably, the seal is able to be radially expanded or compressed in the groove such that the heel of the seal is continuously distal to the bottom of the groove.

Preferably, the arrangement includes a cylindrical stop arranged at the aperture of the groove, against which the seal is able to radially inwardly abut.

Preferably, the stop is made as a single piece with one of both walls of the groove.

Preferably, the stop is an element attached to one of both walls of the groove.

Preferably, the stop is radially arranged at the annular aperture of the groove.

Preferably, the axial distance between an axial end face of the inner radial end of each wing and a median radial plane of the seal is about 1.14 times the radial distance between an outer radial end face of the heel and an inner radial end face of said free radial end of each wing.

Preferably, the outside diameter of the seal is equal to about 500 millimeters.

Preferably, the axially inner conical face of each wing is tilted at an angle of about 41 degrees with respect to an axial direction and the axially outer conical face of each wing is tilted at an angle A2 of about 45 degrees with respect to a radial plane.

The invention also provides a tight assembly of a first annular flange with a second annular flange such that the flanges are axially contacting each other, with respect to a common main axis, at respective radial bearing faces, the flanges bounding a radially inwardly open annular groove, the cross-section of the groove, along a radial plane being generally isosceles trapezoid shaped, the small base of the trapezoid making up a generatrix of a cylindrical bottom of the groove, the great base of the trapezoid corresponding to the aperture of the groove, at which the groove is radially opening and each side of the trapezoid forming a wall of the groove which is formed in one of both annular flanges, characterised in that it includes a seal arranged in said annular groove according to an arrangement in accordance with the invention.

BRIEF DESCRIPTION OF THE DRAWINGS

Further characteristics and advantages of the invention will appear upon reading the detailed description that follows for the understanding of which reference will be made to the appended drawings wherein.

DETAILED DESCRIPTION OF THE PARTICULAR EMBODIMENTS

Figure 1:
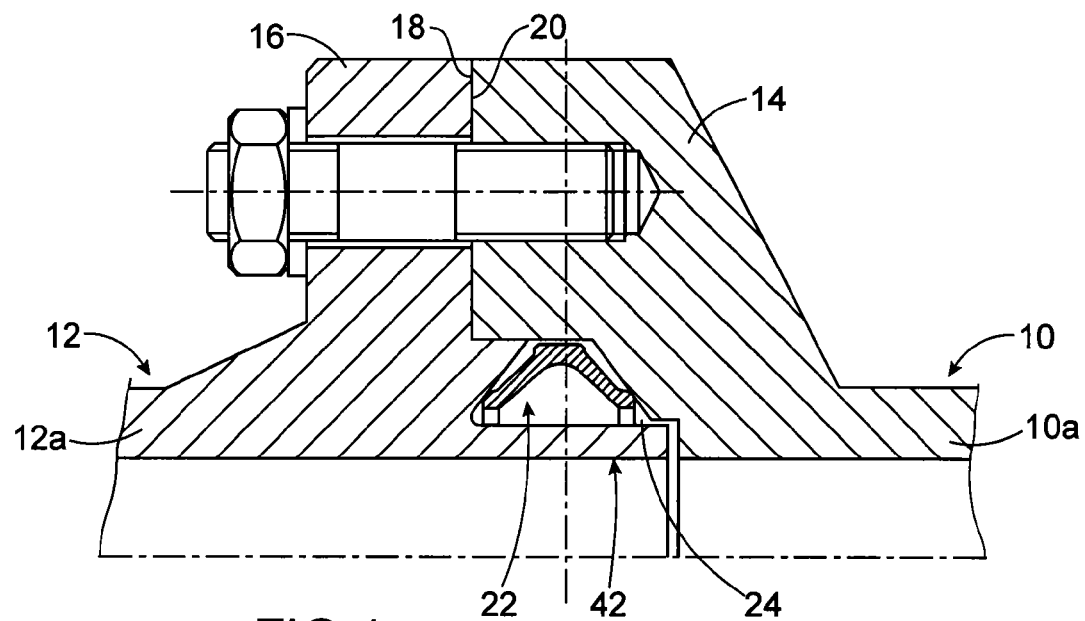
FIG. 1 is a schematic representation of an assembly of two ducts through flanges wherein a biconical seal is arranged in accordance with the invention.

Represented in FIG. 1 is the tight connection of two ducts 10, 12 at the facing ends 10a, 12a thereof through an assembly with flanges.

Each end 10a, 12a of a tube 10, 12 carries a flange 14, 16 which is able to be fixed to the associated flange 16, 14 carried by the other tube 12, 10 herein through screwing.

Each flange 14, 16 radially outwardly extends with respect to the end 10a, 12a of the associated tube 10, 12, and it includes a generally radial bearing face 18, 20 located facing the bearing face 20, 18 of the other flange 16, 14.

The flanges 14, 16 are thus able to contact and axially bear against each other by their respective bearing faces 18, 20.

To improve the tightness of the connection between the ends 10a, 12a of the tubes 10, 12, the assembly includes a seal 22 which is axially interposed between both flanges 14, 16 and which is accommodated in a groove 24 intended therefor.

The seal 22 is a biconical annular seal, that is it includes two conical portions 26 forming the wings of the seal 22 which are axially superimposed and connected by an annular heel 28.

The seal 22 and the groove 24 are oriented such that a pressure difference is applied between the inside and the outside of the tubes, the highest pressure being applied on the concave inner part of the seal.

Thus, as has been represented here, the concave inner part of the seal 22 is radially inwardly directed such that the highest pressure is located inside the tubes.

According to an alternative embodiment, the highest pressure is applied outside the tubes, the seal 22 and the groove 24 are thus directed such that the concave inner part of the seal 22 is radially outwardly directed.

Figure 2:
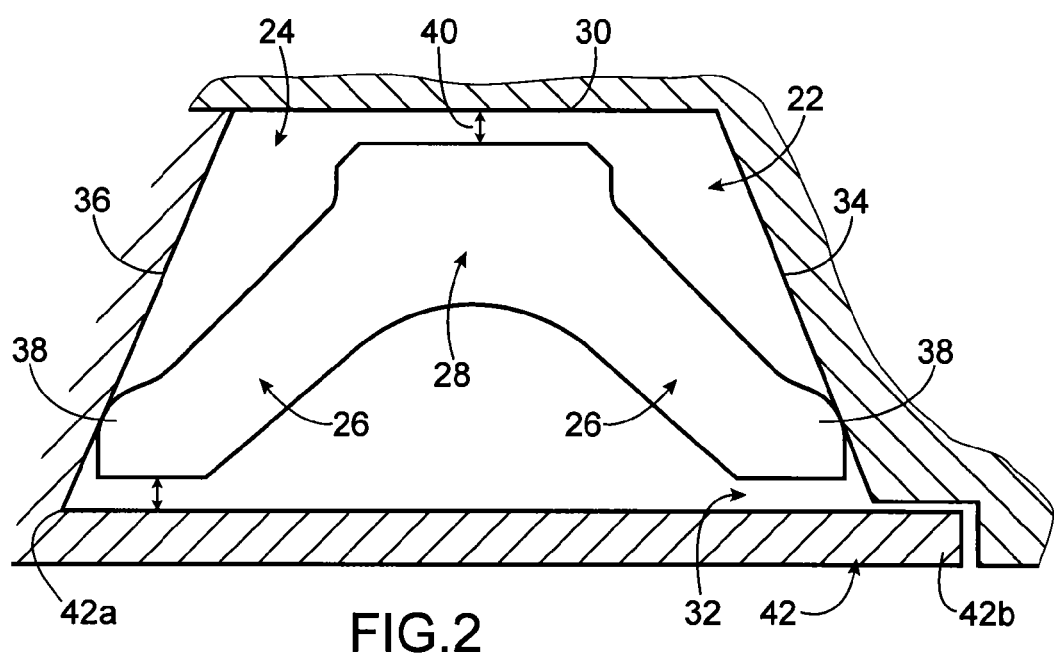
FIG. 2 is a detail in a greater scale of the arrangement of the seal in the groove such as represented in FIG. 1.
Figure 3:
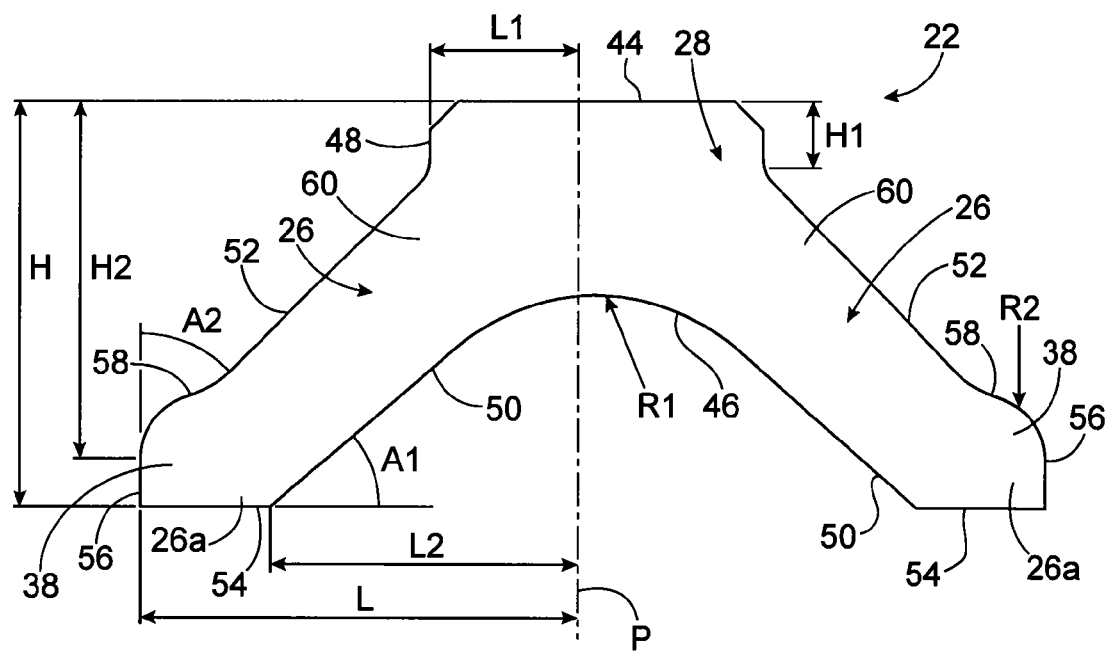
FIG. 3 is a cross-section of the biconical seal represented in FIG. 1.

As can be seen in more detail in FIG. 2, the wings 26 are connected by the heel 28 at their edge 26e having the greatest diameter, such that the cross-section of the seal 22 is inverted V shaped, that is radially inwardly open.

The axial cross-section of the groove 24 which accommodates the seal 22 is in the shape of a trapezoid the bases 30, 32 of which are parallel to the main axis of the ducts 10, 12 and the sides 34, 36 of which are tilted with respect to the bases 30, 32.

Thus, the groove 24 is made such that the great base 32 of the trapezoid is located at the inner radial level of the groove 24 and the small base 30 of the trapezoid is at the outer radial level of the groove 24.

The groove 24 is open at the great base 32 of the trapezoid and the small base 30 of the trapezoid thus corresponds to the bottom of the groove 24.

Here, the axial cross-section of the groove 24 is isosceles trapezoid shaped, that is the sides 34, 36 of the trapezoid are symmetrical with respect to a median radial plane of the groove 24.

The groove 24 is further made such that each side 34, 36 of the trapezoid belongs to one of both flanges 14, 16. The sides 34, 36 of the trapezoid correspond to the side walls of the groove 24 which are consequently conical.

The bottom 30 of the groove 24 is in turn made in a single one of the flanges, herein the flange 14 represented on the right of the figures.

The seal 22 is accommodated in the groove 24 such that the free ends of the wings 26, that is the inner radial ends 26a of the wings 26, are bearing against the tilted walls 34, 36 of the groove 24.

The free end 26a of each wing 26 includes a projecting lip 38 which is able to bear against the side wall 34, 36 of the facing groove 24.

When a pressure is applied to the concave inner part of the seal 22, this pressure is distributed on the associated faces of the wings 26 of the seal 22, here the radially inner faces, so as to produce a bearing strain of the free ends 26a of the wings against the tilted walls 34, 36 of the groove 24.

This pressure is also distributed on the radially inner face of the heel 28, thus producing a strain radially outwardly deforming the heel 28.

Because of dimensional manufacturing tolerances of the flanges 14, 16 and seal 22, the axial distance between the tilted walls 34, 36 of the groove can vary from assembly to assembly or the axial dimension of the seal 22 can vary too.

Such dimensional deviations result in a general variation in the radial position of the seal 22 in the groove 24 such that the free ends of the wings 26 are properly bearing against the tilted walls of the groove 24.

This variation in the radial position of the seal 22 can result in the heel 28 of the seal 22 bearing against the bottom 30 of the groove 24, thus preventing the free ends 26a of the wings 26 from correctly bearing against the tilted walls 34, 36 of the groove 24.

To that end, according to the invention, the dimensions of the seal 22 and the groove 24 are defined such that the heel 28 of the seal 22 is located radially distal to the bottom 30 of the annular groove 24, when the flanges 14, 16 are fixed with each other and the seal 22 is mounted in the groove 24.

Thus, a radial clearance 40 is present between the heel 28 of the seal 22 and the bottom 30 of the groove 24, this clearance being steadily non-zero, regardless of the operating conditions of the assembly, whether it is the pressure difference between the inside and the outside of the ducts 10, 12, the temperature or expansion of the different components.

This non-zero radial clearance 40 enables the seal 22 to be radially expanded as a function of the pressure difference, to adapt the axial compression of the seal 22 in the groove 24 and thus preserve an optimal tightness of the connection of both ducts 10, 12.

During this variation in the radial expansion of the seal 22, that is during an increase in diameter or a decrease in diameter, the clearance 40 is still non-zero, that is the heel 28 is still distal to the bottom 30 of the groove 24, allowing another variation in the radial expansion of the seal 22 in case of a variation in the pressure difference.

The arrangement is particularly suitable for an assembly having a great diameter, for example in the order of 500 mm.

To make assembly easier, in particular to prevent the seal 22 from coming out the groove 24 before both flanges are assembled, the arrangement includes a radial stop 42 which is mounted on one of both flanges 14, 16.

The radial stop 42 is axially located at the aperture 32 of the groove 24, corresponding to the great base of the trapezoid.

Preferably, the radial stop 42 covers the entire aperture 32 of the groove 24, that is it extends radially facing the aperture 32 and both ends of the radial stop 42 are axially located on either side of the groove 24.

The stop 42 includes a first end 42a through which the stop 42 is fixed to a first flange 16, here the flange 16 located on the left of figures, and the stop includes a second end 42b which is located at the other flange 14, beyond the groove 24.

The second end 42b of the stop 42 is located distal to said other flange 14, thus defining a revolution duct connecting the inner volume of the ducts 10, 12 to the inner volume of the groove 24.

The flange 42 thus ensures, besides position blocking of the seal 22 in the groove 24, protection of the seal from products flowing in the ducts 10, 12.

According to a preferred embodiment of the stop 42, this is made as a single piece with the flange 16 to which the stop 42 is fixed.

According to an alternative embodiment, the stop 42 is an element attached to the flange 16, which is fixed by any known means, in particular through screwing.

The heel 28 includes an outer cylindrical face 44, an inner annular face 46 and an outer axial face 48.

Each wing 26 radially inwardly extends from the heel 28 and it is tilted with respect to a median radial plane P of the seal 22 such that the axial level of the base 60 of the wing 26, which is the radially outer end of the wing 26, is lower than the axial level of the free end 26a of the wing 26, which is the radially inner end of the wing 26.

The wing 26 is bounded by an axially inner conical face 50 which extends axially inwardly the inner annular face 46 of the heel 28, an axially outer conical face 52 which is connected to the external axial face 48 of the heel 28 and a generally cylindrical face 54 of the internal radial end.

The lip 38 includes a radial face of outer axial end 56 and an outer radial end face 58. The outer radial end face 58 of the lip 38 is round and convex shaped and its radius of curvature R2 is substantially equal to 0.15 times the radial height H of the seal 22. When the seal 22 is mounted in the associated groove, the outer radial end face 58 of the lip 38 is generally axially outwardly and radially outwardly bearing, that is here in a tilted manner upwardly against a wall 34, 36 facing the groove.

The dimensions of the seal 22 are in particular defined by its outer diameter, the radial height H and the axial width L of the seal 22.

The outer diameter of the seal 22 is equal to about 500 millimeters.

The radial height H of the seal 22 is the radial distance between the outer cylindrical face 44 of the heel 28 and the cylindrical face 54 of inner radial end of each wing 26.

The axial length L of the seal 22 is the distance between the outer axial end face 56 of a lip 38 and the median radial plane P of the seal 22.

According to the invention, the axial length L is equal to 1.14 times the radial height H.

The dimensions of the heel 28 are defined by the axial length L1, corresponding to the distance between the outer radial face 48 of the heel and the median radial plane P, and the radial height H1 of the heel 28, corresponding to the radial length of the outer radial face 48 of the heel 28.

Here, the axial length L1 of the heel 28 is substantially equal to 0.42 times the radial height H of the seal 22 and the radial height H1 of the heel 28 is substantially equal to 0.19 times the radial height H of the seal 22.

Thus, the dimensions of each wing 26 are defined by the axial distance L2 between the axially inner edge 38 of the cylindrical face 54 of inner radial end of the wing 26 and the median radial plane P. Here, the axial distance L2 is substantially equal to 0.81 times the radial height H of the seal 22.

The height $H_2$ corresponding to the radial distance between the outer cylindrical face 44 and the radially outer end of the radial face of external axial end 56 of the lip 38 is substantially equal to 0.89 times the radial height H of the seal 22.

Further, the axially inner conical face 50 of each wing is tilted at an angle A1 of about 41 degrees with respect to an axial direction and the axially outer conical face 52 of each wing 26 is tilted at an angle A2 of about 41 degrees with respect to a radial plane.

The inner annular face 46 of the heel is of rounded shape and its radius of curvature R1 is substantially equal to 0.56 times the radial height H of the seal 22.

The invention claimed is:

1. An arrangement comprising:
    a biconical annular seal including a laid down V shaped cross-section, in an annular groove having a trapezoid shaped cross-section, a small base of the trapezoid corresponding to a cylindrical bottom of the groove and being radially inwardly open at a great base of the trapezoid, and a first side wall of the trapezoid is provided in a first flange and a second side wall of the trapezoid is provided in a second flange,
    wherein the seal includes a radially outer annular heel and two generally conical annular wings extending radially inwardly from the heel, an inner radial end of each wing being axially bearing against an associated wall of the groove, and
    wherein the seal is mounted in the groove such that the heel of the seal is located radially distal to a bottom of the groove so as to present a radial clearance between the heel of the seal and the bottom of the groove, when the first and second flanges are fixed to each other and the seal is mounted in the groove.

2. The arrangement according to claim 1, wherein the seal is configured to be radially expanded or compressed in the groove such that the heel of the seal is continuously distal to the bottom of the groove.

3. The arrangement according to claim 1, wherein an axial distance between an axial end face of the inner radial end of each wing and a median radial plane of the seal is about 1.14 times a radial distance between an outer radial end face of the heel and an inner radial end face of the free radial end of each wing.

4. The arrangement according to claim 1, wherein an outside diameter of the seal is equal to about 500 millimeters.

5. The arrangement according to claim 1, wherein an axially inner conical face of each wing is tilted at an angle of about 41 degrees with respect to an axial direction, and an axially outer conical face of each wing is tilted at an angle of about 45 degrees with respect to a radial plane.

6. A tight assembly of a first annular flange with a second annular flange such that the first and second flanges are axially contacting each other, with respect to a common main axis, at respective radial bearing faces, the first and second flanges bounding the radially inwardly open annular groove, a cross-section of the groove, along a radial plane being generally isosceles trapezoid shaped, a small base of the trapezoid making up a generatrix of a cylindrical bottom of the groove, a great base of the trapezoid corresponding to an aperture of the groove, at which the groove is radially opening and each side of the trapezoid forming a wall of the groove which is formed in one of both annular flanges,
    including a seal arranged in the annular groove according to an arrangement according to claim 1.

7. The arrangement according to claim 1, further comprising a radial stop arranged at an aperture of the groove, against which the seal is configured to radially abut, the radial stop being an element attached to one of the walls of the groove.

8. The arrangement according to claim 1, wherein a portion of the first flange forms the small base of the trapezoid, and a portion of the second flange forms the great base of the trapezoid.

* * * * *